(12) United States Patent
Meyer (10) Patent No.: US 10,926,820 B1
(45) Date of Patent: Feb. 23, 2021

(54) BALANCE ROD APPARATUS TO STABILIZE A BICYCLE RIDER WHEN LEARNING TO RIDE A BICYCLE

(71) Applicant: Louis Meyer, Milford, CT (US)

(72) Inventor: Louis Meyer, Milford, CT (US)

(*) Notice: Subject to any disclaimer, the term of this patent is extended or adjusted under 35 U.S.C. 154(b) by 0 days.

(21) Appl. No.: 16/845,469

(22) Filed: Apr. 10, 2020

(51) Int. Cl.
*B62H 1/10* (2006.01)
*B62H 7/00* (2006.01)
*B62K 19/40* (2006.01)

(52) U.S. Cl.
CPC .............. *B62H 1/10* (2013.01); *B62K 19/40* (2013.01); *B62H 2700/00* (2013.01)

(58) Field of Classification Search
CPC ... B62H 1/10; B62H 1/12; B62H 1/14; B62H 1/06; B62H 7/00; A63B 69/16; B62K 19/40; B62J 1/28; B62J 50/10; B62J 50/40
USPC ..... 280/304, 293, 288.4, 759, 755; 446/396; 116/53

See application file for complete search history.

(56) References Cited

U.S. PATENT DOCUMENTS

| 527,549 | A |   | 10/1894 | Frankenberg |               |
|---------|---|---|---------|-------------|---------------|
| 561,262 | A | * | 6/1896  | Lincoln     |               |
| 850,527 | A | * | 4/1907  | Ellis       |               |
| 2,249,803 | A | * | 7/1941 | Wooten     | G09F 23/14    |
|         |   |   |         |             | 40/415        |
| 2,767,995 | A | * | 10/1956 | Stout      | B62D 49/08    |
|         |   |   |         |             | 280/755       |
| 3,603,032 | A | * | 9/1971 | Heron       | A63H 13/12    |
|         |   |   |         |             | 446/396       |
| 3,857,584 | A | * | 12/1974 | Nohava     | B62H 7/00     |
|         |   |   |         |             | 280/293       |
| 3,910,603 | A | * | 10/1975 | Shipman    | B62H 1/00     |
|         |   |   |         |             | 280/293       |
| 4,116,154 | A |   | 9/1978 | Harris       |               |
| 4,575,189 | A | * | 3/1986 | Johnson     | B62J 6/20     |
|         |   |   |         |             | 116/35 A      |
| 5,106,136 | A | * | 4/1992 | Crain       | B62J 27/00    |
|         |   |   |         |             | 280/304.3     |
| 5,169,165 | A | * | 12/1992 | Oates      | B62H 1/12     |
|         |   |   |         |             | 280/282       |

(Continued)

FOREIGN PATENT DOCUMENTS

| CN | 204399378 U | 6/2015 |
| CN | 107640247 A | 1/2018 |
| CN | 710075      | 5/2019 |

OTHER PUBLICATIONS

French, The Death-Defying (So Far) Feats of the Magnificent Wallenda, GQ Magazine, Jun. 12, 2013, https://www.gq.com/story/nik-wallenda-tightrope-walk-across-grand-canyon, Conde Nast, New York, New York.

(Continued)

*Primary Examiner* — Anne Marie M Boehler
(74) *Attorney, Agent, or Firm* — Law Office of John B. Hudak, PLLC; John B. Hudak (57) ABSTRACT

An apparatus which is helpful in teaching a person how to ride a bicycle. The apparatus is connected to a bicycle and has balance rods extending from the apparatus. The apparatus increases the ability of the new rider to balance. The balance rods can be adjusted by changing the length the balance rods are extended, where the length of extension is decreased to reduce the effect of the apparatus as the new rider learning to ride the bicycle becomes more proficient.

1 Claim, 10 Drawing Sheets

(56) References Cited

U.S. PATENT DOCUMENTS

| | | | | |
|---|---|---|---|---|
| 5,418,696 A * | 5/1995 | Izzo, Sr. | ............... | B62J 6/015 |
| | | | | 362/473 |
| 5,454,579 A * | 10/1995 | Chen | ............... | B62K 1/00 |
| | | | | 280/205 |
| 5,752,898 A * | 5/1998 | Porkka | ............... | A63B 69/16 |
| | | | | 482/105 |
| 6,244,612 B1 * | 6/2001 | Henderson | ............... | B62H 7/00 |
| | | | | 280/293 |
| 7,055,843 B2 * | 6/2006 | Kan | ............... | B62J 27/00 |
| | | | | 280/291 |
| 7,549,664 B2 * | 6/2009 | Bozung | ............... | B62H 1/06 |
| | | | | 280/293 |
| 8,905,611 B2 * | 12/2014 | Connor | ............... | F21S 4/00 |
| | | | | 362/554 |
| 9,051,016 B2 * | 6/2015 | Boger | ............... | B62H 7/00 |
| 10,112,071 B2 * | 10/2018 | Dooner | ............... | A63B 21/16 |
| 10,155,557 B2 * | 12/2018 | Alvarez | ............... | B62J 27/00 |
| 10,436,543 B2 | 10/2019 | Wilkens | | |
| 2002/0096858 A1 * | 7/2002 | Shaw | ............... | B62H 7/00 |
| | | | | 280/293 |
| 2003/0133308 A1 * | 7/2003 | Christensen | ............... | B62J 6/05 |
| | | | | 362/523 |
| 2005/0212254 A1 | 9/2005 | Heitner | | |
| 2006/0198154 A1 * | 9/2006 | Naylor | ............... | B62J 27/00 |
| | | | | 362/473 |
| 2015/0202515 A1 * | 7/2015 | Shirk, II | ............... | A63B 69/16 |
| | | | | 482/63 |
| 2015/0225033 A1 * | 8/2015 | Yap | ............... | B62K 15/008 |
| | | | | 280/259 |
| 2017/0144718 A1 * | 5/2017 | Tinaphong | ............... | B62K 11/007 |

OTHER PUBLICATIONS

Blog post, posted by Ryan, Balancing Toys, sketchpad, The Tinkering Studio, Feb. 2, 2012, https://www.exploratorium.edu/tinkering/blog/2012/02/02/balancing-toys, Exploratorium, San Francisco, California.

* cited by examiner

BALANCE ROD APPARATUS TO STABILIZE A BICYCLE RIDER WHEN LEARNING TO RIDE A BICYCLE

BACKGROUND OF THE INVENTION (1) Field of the Invention

The present invention relates to an apparatus, which makes learning to ride a bicycle easier for a beginning bicycle rider.

(2) Description of Related Art Including Information Disclosed Under 37 CFR 1.97 and 1.98

When learning to ride a bicycle, a beginner bicycle rider must learn a combination of balance, steering, and pedaling. These skills can be learned when a person teaches a new bicycle rider to ride, where the new rider sits on a bicycle and the teacher holds the new rider in a balanced position by holding onto the rear of the bicycle seat. Then the new rider starts to pedal and the teacher walks or runs along with the new rider and the teacher lets go of the bicycle seat and allows the new rider to ride as far as possible. This method puts strain on the teacher. Also, this method doesn't provide as much assistance to a new rider as is necessary for many new riders. Some solutions to these problems have tried to: reduce the strain on the teacher; provide extra assistance to the new rider; or both reduce strain on the teacher and provide extra assistance to the new rider. But, the solutions have not completely succeeded in solving these problems. For some solutions, there is still strain on the teacher. For other solutions, assistance is not provided for, or insufficient assistance is provided for, learning each of the required skills of balance, steering, and pedaling.

BRIEF SUMMARY OF THE INVENTION

The present invention is an apparatus for stabilizing a bicycle rider, which provides a new bicycle rider a greater ability to learn to ride a bicycle. The balance rod apparatus connects to a bicycle and contains balance rods that extend away from the bicycle.

The balance rod apparatus has a connector that connects to a bicycle. The connector is attached to a balance rod structure. The balance rod structure is composed from a balance rod holder piece and two balance rods. The connector is attached to the balance rod holder piece. The two balance rods are adjustably attached to the balance rod holder piece. The balance rods extend away from the bicycle. The length of extension of the balance rods can be adjusted to increase or decrease the effect of the balance rod apparatus.

The balance rod apparatus increases the ability of the new rider to balance, while giving some sense of what it feels like to balance on a bicycle without any assistance. The new rider gains the assistance from the balance rod apparatus, while also learning the skills of steering and pedaling. As the new rider becomes a better rider, the length of extension of the balance rods can be decreased, therefore providing less assistance to the new rider and allowing the new rider to progress to riding a bicycle without any assistance.

DETAILED DESCRIPTION OF THE INVENTION

After the balance rod apparatus 10 is connected to the bicycle 3, the person teaching the new rider, has two options of how to use the apparatus. For the first option, the teacher can instruct the new rider to keep themselves in an upright position on the bicycle 3 with one foot on the ground and the other foot on a pedal of the bicycle 3. Then the teacher will instruct the new rider to take the foot from the ground and place it on the other pedal and begin pedaling, and then ride as far as possible. Or, the second option, if the teacher does not feel strain with this second option, the teacher can hold the new rider in an upright position on the bicycle 3 and walk or run along when the new rider begins to pedal and let go of the bicycle 3 and allow the new rider to ride as far as possible. When using either option, the new rider will have the assistance of the balance rod apparatus 10 when the new rider begins to pedal on their own. The balance rods 1 prevent the loss of balance as quickly as without the balance rod apparatus 10. As the new rider's balance on the bicycle 3 improves, the balance rods 1 can be adjusted so the balance rods 1 do not extend as far away from the bicycle 3, reducing the effect of the balance rod apparatus 10 on the balance of the new rider. The assistance increases the new rider's ability to balance while also allowing the new rider to learn the other required skills of steering and pedaling. Additionally, there is a benefit to the teacher because there is an option for using the balance rod apparatus 10 where the teacher does not have to strain by holding onto the bicycle seat and walk or run along with the new rider.

Figure 1:
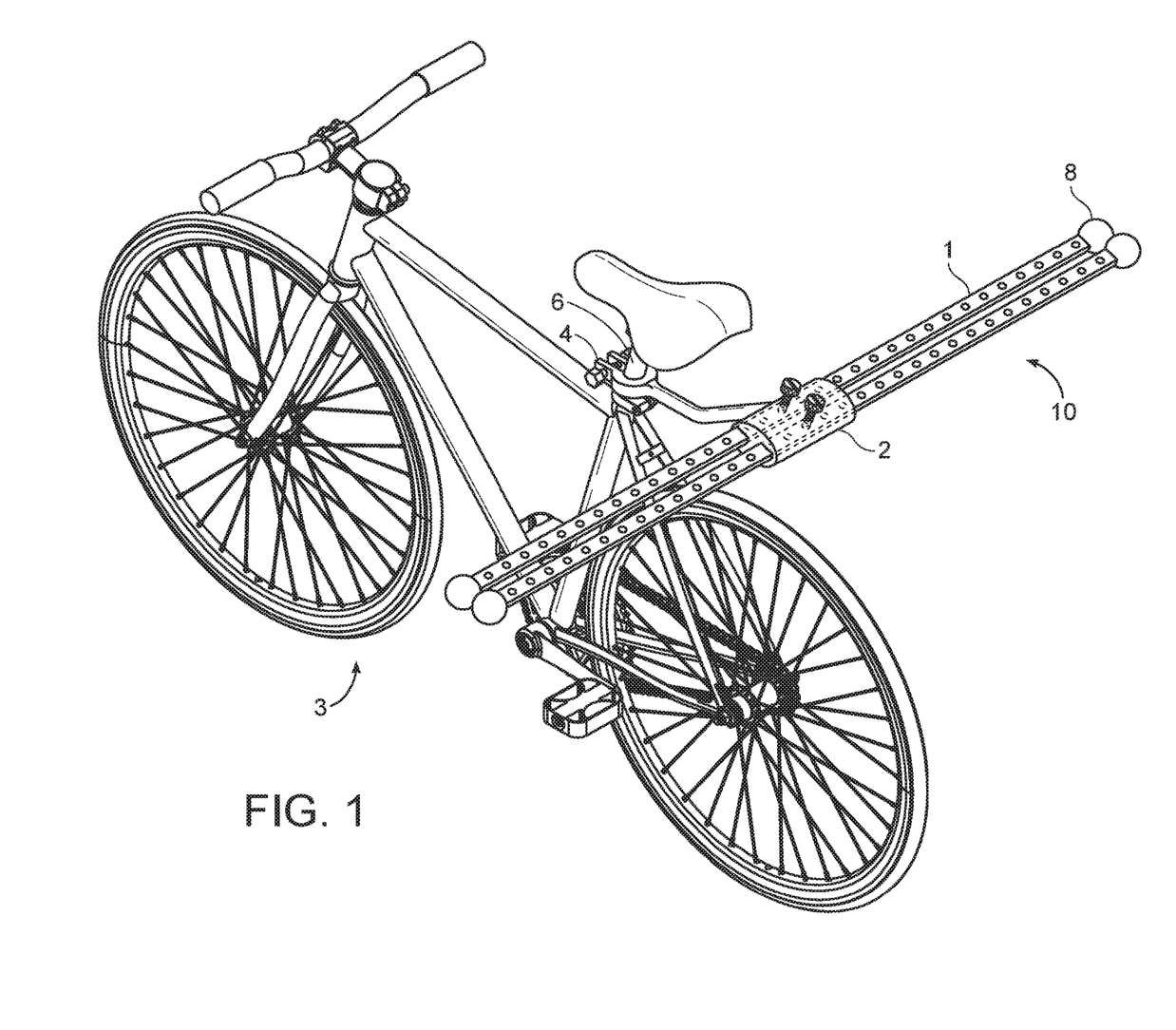
FIG. 1 is a perspective view of an embodiment of the balance rod apparatus connected to a bicycle with the balance rods at a position of their smallest amount of extension

Referring to FIG. 1, a bicycle 3 is shown with an embodiment of the balance rod apparatus 10 connected to the seat post 6 of a bicycle 3. The balance rod apparatus 10 is shown connected to the seat post 6 but the balance rod apparatus 10 could be connected, in different embodiments, to other parts of a bicycle 3 such as a rear portion of the bicycle frame or the bicycle seat. The balance rod apparatus 10 connects to the seat post 6 of a bicycle 3 with a connector 4. In the embodiment shown, the connector 4 is a clamp tightened with a nut and bolt. In different embodiments, the connector 4 can be another type of connector, which can include but is not limited to, a quick release clamp tightened with a pin and lever, a clamp made of two plates that fit over part of the frame of the bicycle that tightens by nuts and bolts, or a bracket which connects to more than one part of the bicycle with clamps tightened by a nut and bolt.

Figures 2A, 2B:
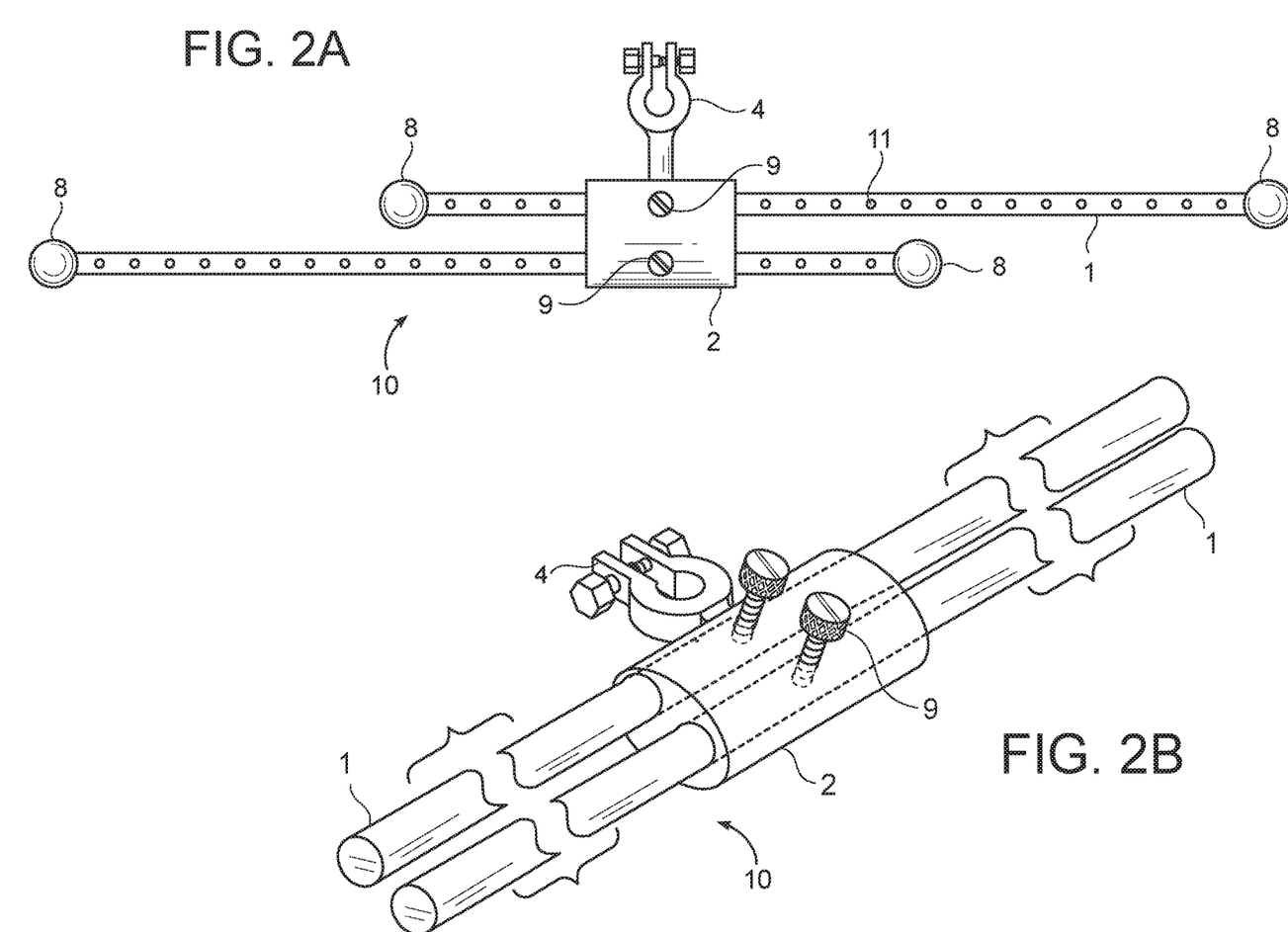
FIG. 2A is a top view of an embodiment of the balance rod apparatus with the balance rods at a position close to their largest amount of extension
FIG. 2B is a perspective view of an embodiment of the balance rod apparatus with a non-elongated connector, circular cross section shaped balance rods, and no weights attached to the ends of the balance rods

Referring to FIG. 2A, the figure is a top view of an embodiment of a balance rod apparatus 10. The embodiment shows two balance rods 1 which are extended close to their maximum length of extension. When first using the balance rod apparatus 10 the balance rods 1 will be at their maximum length of extension to gain the most benefit from the balance rod apparatus 10. When the rider improves, needing less assistance, the balance rods 1 can be extended a shorter length from the bicycle 3, and eventually have the position in FIG. 1. As the new rider becomes more proficient in balancing, the length of extension of the balance rods 1 would be decreased so the new rider develops a feel for the balance of a bicycle 3 closer to what would be felt on a bicycle 3 with no attached balance rod apparatus 10.

A balance rod 1 is an elongated piece of material. The balance rod 1 is adjusted by changing the part of the balance rod which is attached to the balance rod holder piece, meaning the balance rod 1 is adjusted when it is unsecured from its current position, moved, and then secured in a different position. A balance rod 1 can be a piece of solid material. A balance rod 1 may also be made from multiple components that are combined together, such as a center core of one material surrounded by another material, multiple layers of material, or smaller pieces of material fastened together with hardware, although the balance rod 1 will be adjusted by changing the part of the balance rod which is attached to the balance rod holder piece. In other words, the balance rod 1 will be adjusted as a single piece of material. A balance rod 1 that can be adjusted as a single piece of material in many instances produces a balance rod 1 that has beneficial characteristics. These beneficial characteristics include: flexibility of a balance rod 1; a curved form of a balance rod 1; the ability of a balance rod 1 to move in place in a jiggling, rattling, or slight swaying motion; or the ability to withstand a heavy impact after a hard fall. If the balance rod 1 did not act as a single piece of material, these beneficial characteristics, in many instances, could not be achieved, or could possibly be achieved but require more costly manufacturing, which is not ideal for an apparatus that will only be used for a limited period of time when a new rider is learning to ride.

The dimensions of a balance rod 1 can vary. An example of the dimensions of a balance rod 1 is approximately 1.25 inches in diameter and 4.5 feet in length, with an oval cross section, where the diameter is measured at the largest part of the oval. The approximate range of dimensions for other embodiments of the balance rod 1 includes a cross section diameter of 0.5 to 3 inches and a length of 4 to 6 feet. A balance rod 1 can be made from a rigid material or a flexible material. Examples of a rigid material are, but are not limited to, wood, plastic, composite material, or metal. And, examples of a flexible material are, but are not limited to, a semi-rigid rubber, fiber glass, plastic, or a foam covered thin metal bar. A flexible material will bend when extended from the balance rod holder piece 2. The expected bend is a distance of 0.25 to 6 inches downward at the tip, when a 4 foot segment of balance rod 1 is extended horizontally from the balance rod holder piece 2. The bend of the flexible material is shown in FIG. 4B, in which the arrowed line labeled 13 represents the amount of bend from the horizontal attachment. The measurements should be taken after any removable weights 8 are removed from the ends of the balance rods, and if a weight 8 is not removable the measurements are taken whereby the weight 8, which is not removable, is considered part of the balance rod 1 such that the length of extension and the length of downward bend includes any added distance from the non-removable weight 8. The measurement for the distance extended is taken from the surface of balance rod holder piece 2 at the point of attachment of the balance rod 1 and balance rod holder piece 2, to the tip of the balance rod 1, when the balance rod 1 is supported and not allowed to bend. The measurement for the distance of bending is taken from the bottom surface of the balance rod 1 at the point of attachment of the balance rod 1 and balance rod holder piece 2, to the farthest distance the tip of the balance rod 1 extends downward. The bottom surface of the balance rod 1 is determined by the orientation that the balance rod apparatus 10 will connect to the bicycle 3. The amount of bending can vary depending on the desired effect. A flexible balance rod 1 will increase the ability of the balance rods 1 to dampen the effect of the quick and sudden movements of a new bicycle rider and therefore increase the ability of the balance rod apparatus 10 to assist a new rider to balance while learning to ride a bicycle 3. The deflection of a flexible balance rod 1 can also absorb some of the impact force when the new rider loses control of the bicycle 3 and the balance rod apparatus 10 hits the ground.

Figure 6A:
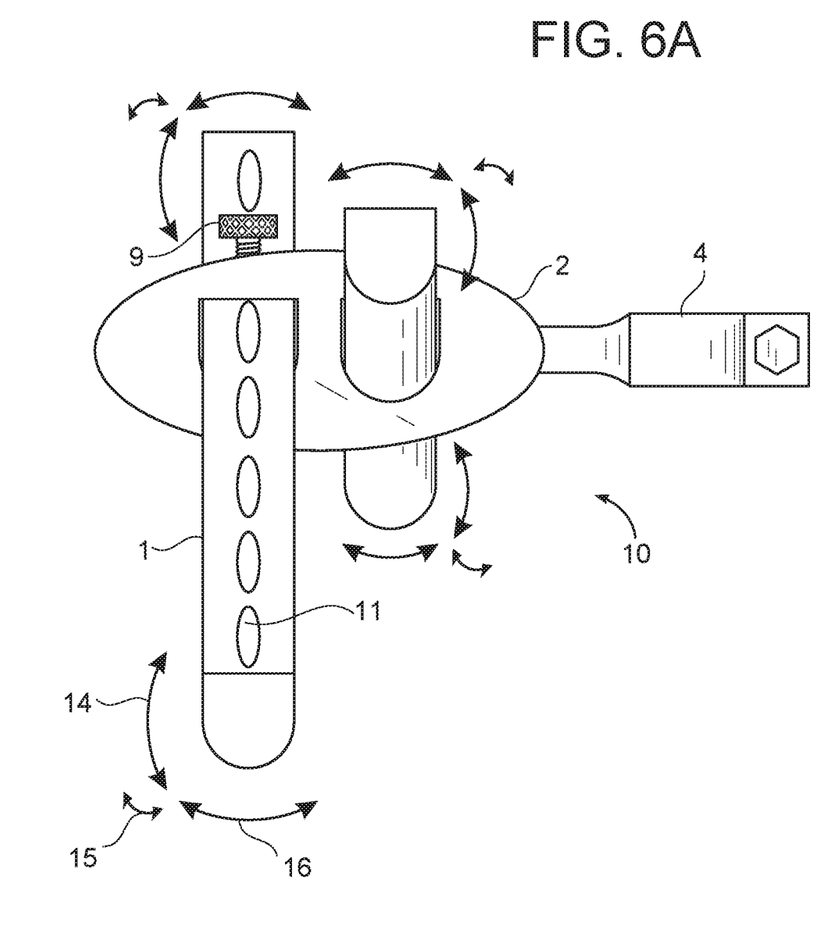
FIG. 6A is a side view of an embodiment of the balance rod apparatus, in which the balance rods are at an angle to each other and the balance rods move within the balance rod guidance holes
Figure 6B:
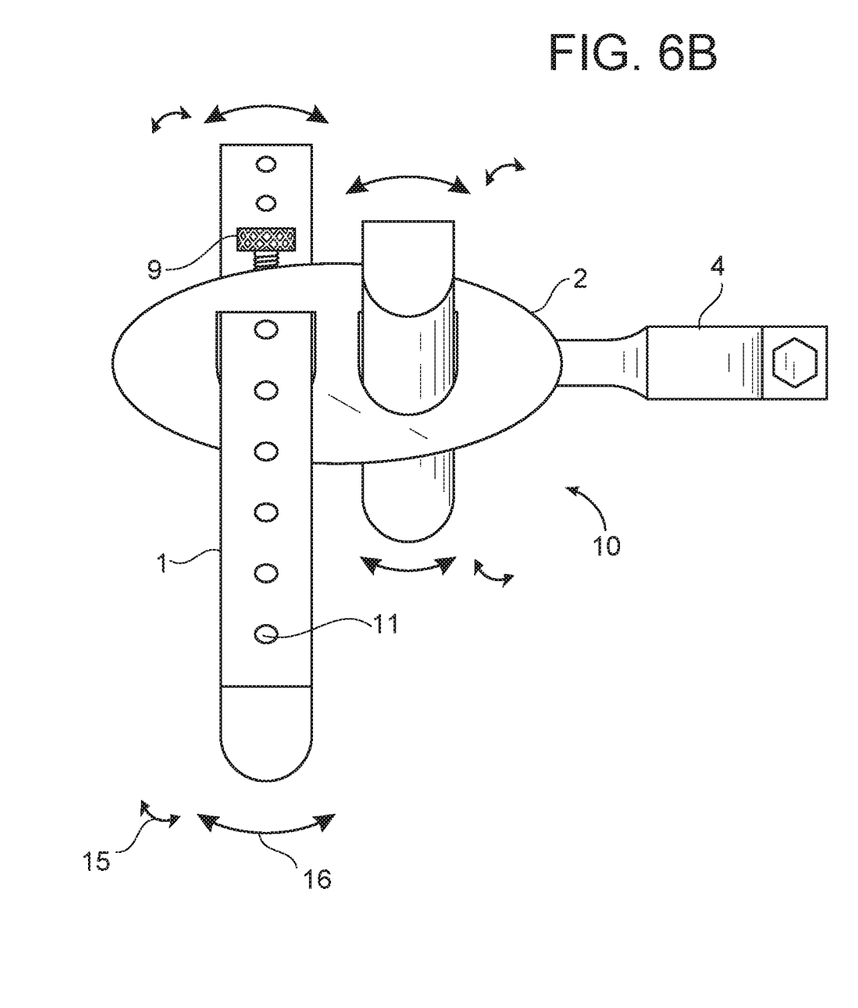
FIG. 6B is a side view of an embodiment of the balance rod apparatus, in which the balance rods are at an angle to each other and the balance rods move within the balance rod guidance holes while the overall length of extension of the balance rods is kept constant by balance rod securing pieces
Figure 6C:
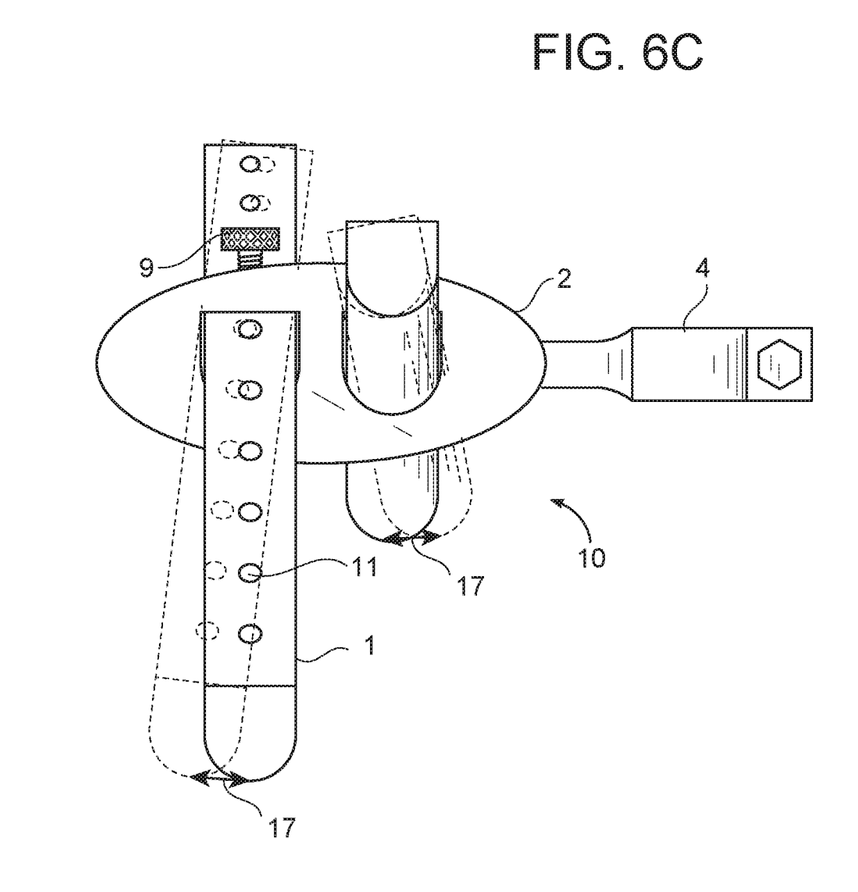
FIG. 6C is a side view of an embodiment of the balance rod apparatus, in which the balance rods are at an angle to each other and the balance rods move within the balance rod guidance holes while the overall length of extension of the balance rods is kept constant by balance rod securing pieces, with the arrows representing the distance a tip of a balance rod will move from its resting position

The sudden and quick movements of a new rider can also be dampened by movement of the balance rods 1 in particular embodiments, with one example shown in FIG. 6A. This movement of the balance rods 1, which takes the form of jiggling, rattling, or slight swaying of the balance rods 1, dampens the effect of the quick and sudden movements of a new bicycle rider and therefore increases the effect of the balance rod apparatus 10 and increases the ability of the new rider to balance while learning to ride a bicycle 3. In another embodiment, in FIG. 6B, the movement is also in the form of jiggling, rattling, or slight swaying of the balance rods 1, but the length of extension of the balance rods 1 from the balance rod holder piece 2 is kept constant. The movement is represented in FIG. 6A by arrows in three directions near the tips of the balance rods 1, which represent the jiggling, rattling, or slight swaying motion of a balance rods 1 when in use, because there will be side-to-side movement 16, up-and-down movement 15, and movement in the length of extension 14. The movement is represented in FIG. 6B by arrows in two directions near the tips of the balance rods 1, which represent the jiggling, rattling, or slight swaying motion of balance rods 1 when in use, because there is only side-to-side movement 16 and up-and-down movement 15 because the length of extension of the balance rods 1 is kept constant. The movement will occur when the balance rod apparatus is in use and will be unpredictable, therefore the balance rods 1 may move in different directions as shown in FIG. 6C. The movement in the embodiment in FIG. 6A and FIG. 6B occurs because of a loose attachment between the balance rods 1 and the balance rod holder piece 2. The loose attachment in FIG. 6A occurs due to oversized balance rod guidance holes 7 and elongated balance rod securing piece acceptance holes 11. The loose attachment in FIG. 6B occurs due to oversized balance rod guidance holes 7. A further discussion of the balance rod guidance holes 7 and balance rod securing piece acceptance holes 11 is below. Other embodiments may include other methods for implementing the movement such as an attachment with a universal joint.

Figure 8A:
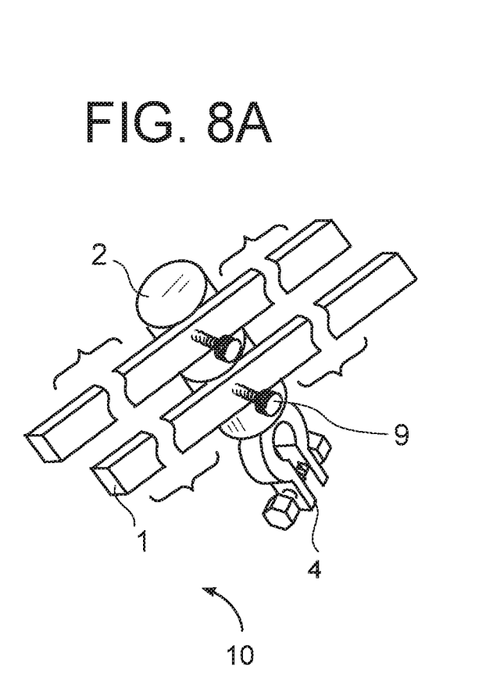
FIG. 8A is a perspective view of an embodiment of a balance rod apparatus with a rod as the balance rod holder piece
Figure 8B:
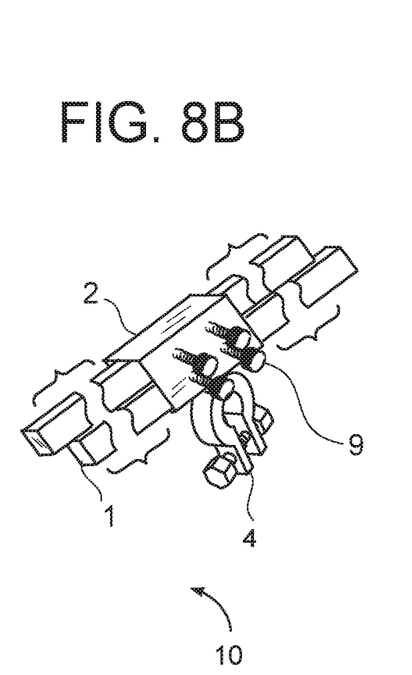
FIG. 8B is a perspective view of an embodiment of a balance rod apparatus with a square cross section tube as the balance rod holder piece
Figure 8C:
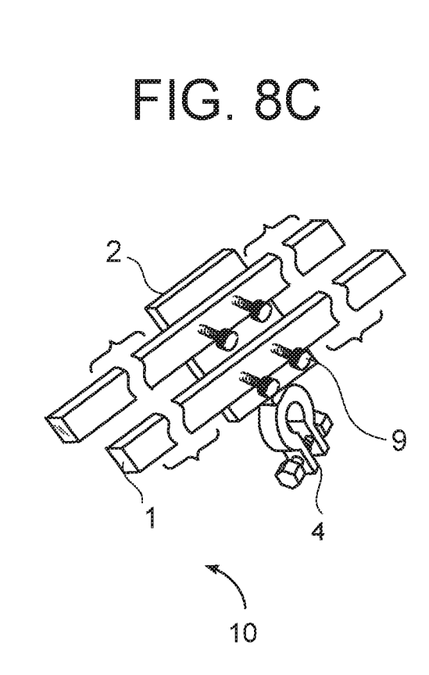
FIG. 8C is a perspective view of an embodiment of a balance rod apparatus with a plate as the balance rod holder piece

The balance rod holder piece 2 is a structural element to which the balance rods 1 are adjustably attached. The balance rod holder piece 2 and attachment of the balance rods 1 can have more than one form, which can include but is not limited to, a block with two holes through the block where each balance rod 1 will orient through a different hole, a block with one large hole through the block where both balance rods will orient through the same hole, a metal plate where the balance rods 1 can be adjustably attached directly to the plate (FIG. 8C), a bent metal plate with two channels for the balance rods 1, a metal bar with a flat side where the balance rods 1 can be adjustably attached directly to the bar, a rod with flat portions where the balance rods 1 can be adjustably attached (FIG. 8A), a tube where both balance rods will orient through the tube (FIG. 8B), or a bar shaped in the form of a V with the bottom of the V attached to the connector 4 and a balance rod 1 adjustably attached at each end at the top of the V. The embodiment of a balance rod apparatus 10 shown in FIG. 2B has a balance rod holder piece 2, which is a block with holes for the balance rods 1. The block is solid material and the block has an elliptical profile on two of its faces. The use of the term "block" should be interpreted as a solid mass of material. A block does not need to have straight sides or corners, such as a cube, but can have non-straight edges or surfaces, such as the balance rod holder piece 2 in FIG. 2B. The term block is meant to describe a piece of solid material which has dimensions that are close to each other in each of its three axis's. So, a rectangular block could have sides of 3 inches×4 inches×5 inches. An elongated form or a plate would not be considered a block. An elongated form could have dimensions of 1 inch×1 inch×10 inches, which would not be considered a block. A plate could have dimensions of 0.25 inches×3 inches×5 inches, which would not be considered a block.

Figures 3A, 3B:
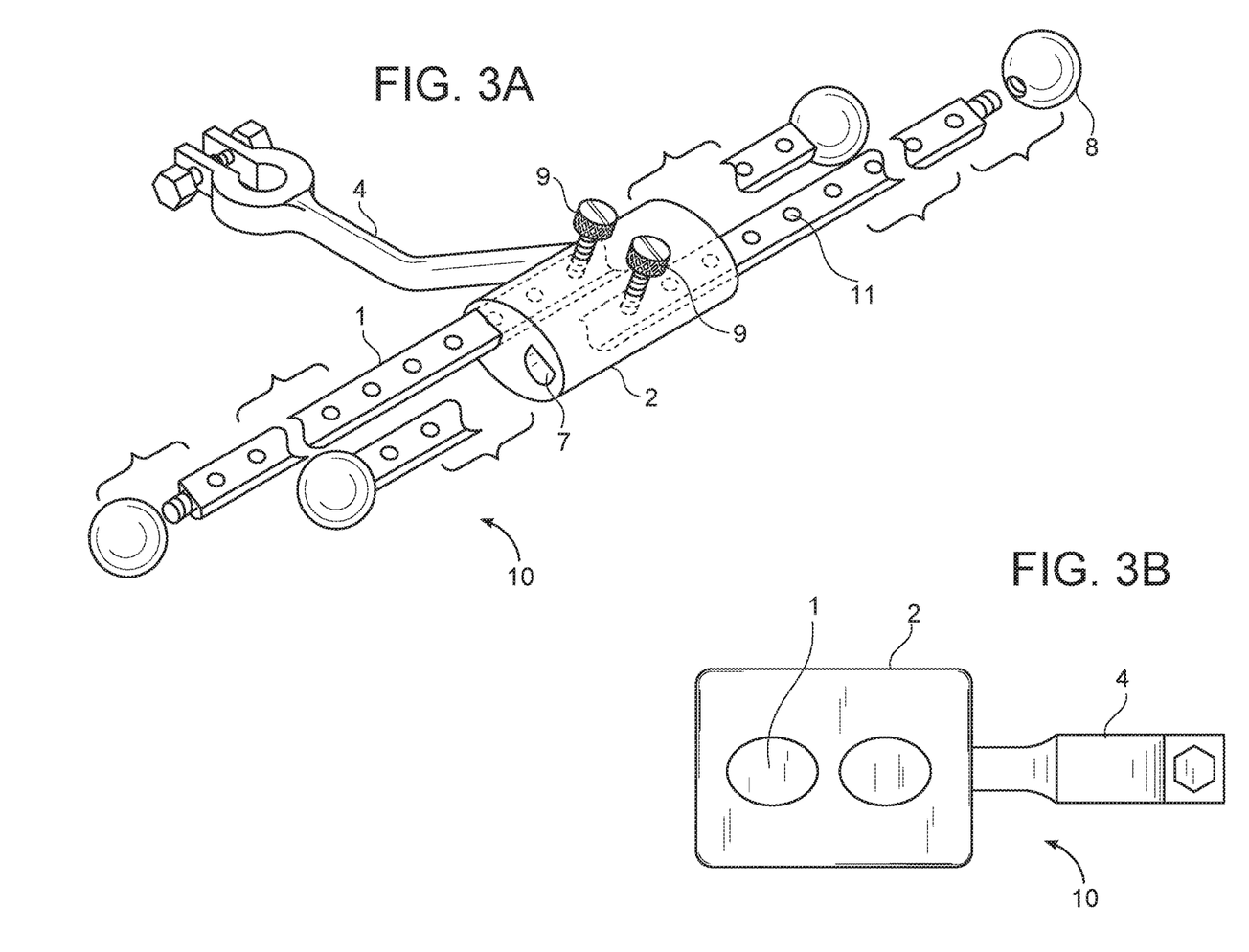
FIG. 3A is a perspective view of an embodiment of the balance rod apparatus, which highlights the balance rod guidance holes in the balance rod holder piece
FIG. 3B is a side view of an embodiment of the balance rod apparatus, which has oval cross section shaped balance rod guidance holes and oval cross section shaped balance rods

Referring to FIG. 3A, the embodiment shows a balance rod apparatus 10 where only part of the balance rods 1 are shown, as a way to show the balance rod guidance holes 7 which hold the balance rods 1 in this embodiment. The balance rod holder piece 2 is a block of solid material. The block has an elliptical profile on two of its faces. The balance rod holder piece 2 has holes through the block, from one side of the block to another side of the block, which hold the balance rods 1. The holes through the balance rod holder piece 2, which hold the balance rods 1, are called balance rod guidance holes 7. In this embodiment, the balance rod guidance holes 7 have a D-shape cross section, which prevents the balance rods 1 from spinning in the balance rod guidance holes 7 and allows the balance rod securing pieces 9 to align with a corresponding balance rod securing piece acceptance holes 11 along the length of the balance rod 1.

A balance rod securing piece 9 is a piece of hardware or another structural member that secures the position of the balance rods 1. Examples of possible balance rod securing pieces 9 can be, but are not limited to, a captive screw, a regular screw, a push pin, a spring loaded pin, a bolt and nut, or a U-bolt and nuts. A screw is considered captive because the screw can move in and out and is also constructed with an element which prevents the screw from being completely removed so the screw will not fall out and be lost by the user. A balance rod securing piece 9 can secure each balance rod 1 individually, as in FIG. 3A, in which that embodiment a screw is used. A push pin as a balance rod securing piece 9 is pictured in FIG. 4A. The balance rod securing piece 9 can also be a single piece of hardware which can secure both balance rods 1 simultaneously, examples of a single piece of hardware or structural member include but are not limited to: a U-bolt; a casted piece of material that fits around the balance rods 1 and is secured down with a bolt; or a plate with grooves which can secure both balance rods 1.

The balance rod securing piece acceptance holes 11 are holes along the length of a balance rod 1 where balance rod securing pieces 9 fit into. The embodiment in FIG. 3A has the balance rods 1 held at a particular length of extension because the balance rod securing pieces 9 fit into balance rod securing piece acceptance holes 11. The balance rod securing piece acceptance holes 11 are convenient for the user to obtain a predictable length of extension. Other embodiments may include balance rods 1 that do not include balance rod securing piece acceptance holes 11, such as in FIG. 2B.

The shape of the balance rod securing piece acceptance holes 11 can change the properties of the balance rods 1. For example, the embodiment shown in FIG. 6A has elongated balance rod securing piece acceptance holes 11, which allows movement in the length of extension, in addition to the movement caused by the oversized balance rod guidance holes 7. In FIG. 6B, the embodiment has oversized balance rod guidance holes 7, but non-elongated balance rod securing piece acceptance holes 11, therefore allowing movement, but not a change in the length of extension of the balance rods 1.

Both FIG. 6A and FIG. 6B show a side view of an embodiment of a balance rod apparatus 10 in which: (a) the balance rod guidance holes 7 do not orient the balance rods 1 in a straight line with each other but instead the balance rods 1 are at an angle to each other; and (b) the balance rod guidance holes 7 are slightly oversized compared to the balance rods 1 where the oversized feature of the balance rod guidance holes 7 forms a loose attachment of the balance rods 1 allowing a side-to-side motion 16 and up-and-down motion 15 of the balance rods 1 when the balance rod apparatus 10 is in use. The difference between the embodiments in FIG. 6A and 6B is the shape of the balance rod securing piece acceptance holes 11, which allows for the different types of movement.

Referring to FIG. 3A, the embodiment of the balance rod apparatus 10 has balance rods 1 with a D-shape cross section. The embodiment shows the flat surface of the D-shape facing directionally upward, when the balance rod apparatus 10 connects to the seat post 6 of a bicycle 3. The flat surface of the D-shape, in different embodiments, can face in any direction but the ideal orientation would have the flat surface of the D-shape face in an upward and slightly rotated back orientation, from the back wheel of the bicycle 3, which allows the balance rod securing pieces 9 to be easily manipulated by the user. The balance rod guidance holes 7 can vary in their shape and where the holes orient through the balance rod holder piece 2. The balance rod guidance holes 7 and the balance rods 1 can have different shapes other than a D-shape, which prevent spinning of the balance rod 1 and provide the alignment of a balance rod securing piece 9 and a balance rod securing piece acceptance hole 11. Examples of the different shapes can include but are not limited to, an oval shape, hexagonal shape, square shape, or triangular shape. FIG. 3B is a side view of an embodiment of a balance rod apparatus 10 with balance rods 1 and balance rod guidance holes 7 with a cross section of an oval. The balance rods 1 can also have a cross section which does not prevent spinning, such as a circular cross section, as in FIG. 2B.

In addition to adjusting the length of extension of the balance rods 1, the balance rod apparatus 10 can be adjusted with removable weights 8 at the ends of the balance rods 1 as shown in FIG. 3A. In some embodiments, the weights 8 could be removable at both ends of the balance rods 1. In other embodiments, the weights 8 could be removable at only one end of the balance rods 1. Or, there can be embodiments with no weights at the ends of the balance rods 1 as in FIG. 2B. In FIG. 3A the weights are removable, where there is a threaded end to the balance rod 1 which fits into a corresponding threaded hole in a weight 8. Other methods for making a weight removable are possible, where one hypothetical example of a method for making a weight removable is a screw going through the weight 8 into the end the balance rod 1. The weights 8 can take multiple shapes but the likely most usable form is a round shape or hemispherical shape. The weights 8 can also be altered to have very little weight but attached to the end of the balance rod 1 as a safety element to prevent the end of the balance rod 1 from hurting the rider or another person. The weights 8 can be changed by replacing a heavy weight 8 with a less heavy weight 8, or the weight 8 can be removed all together, to alter the effect of the balance rod apparatus 10. The weights 8 may have a cut away or flat surface so the weights 8 will not come in contact with an adjacent balance rod 1.

Figure 5:
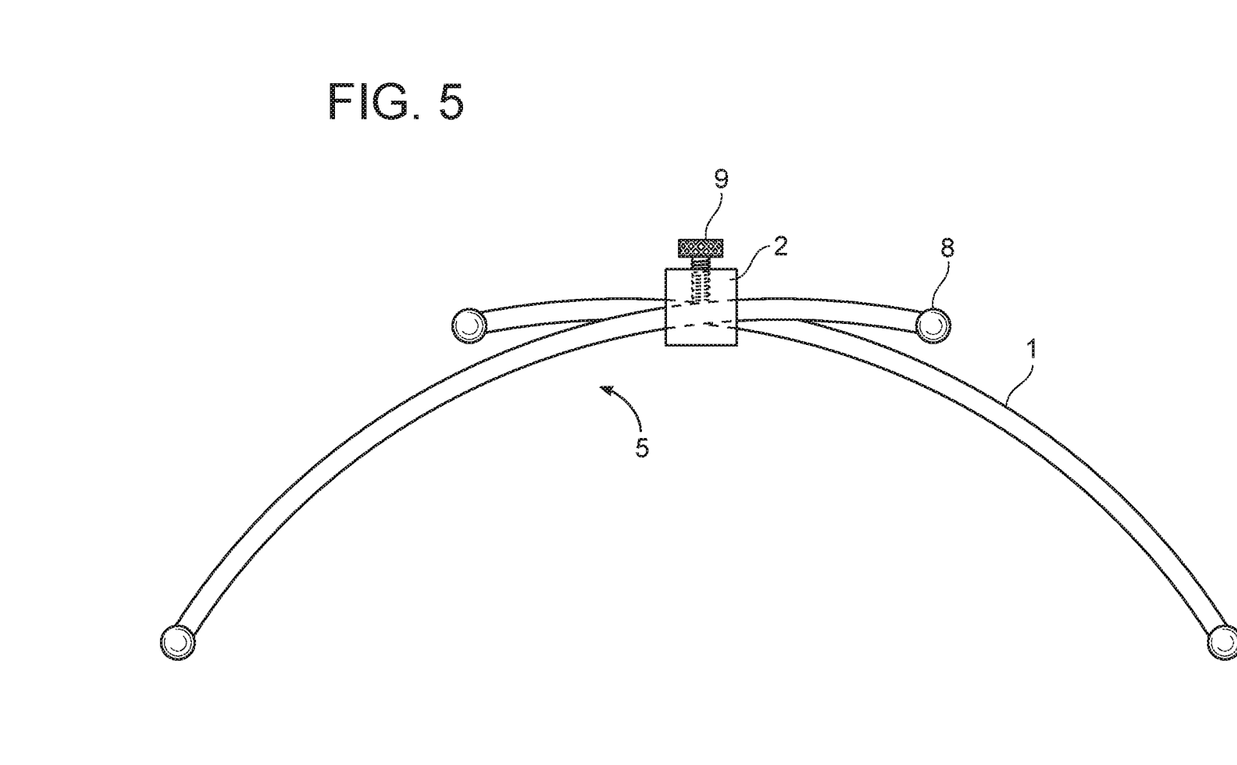
FIG. 5 is a rear view of an embodiment of a balance rod structure, in which the balance rods are curved

Referring to FIG. 5 is a rear view of an embodiment of a balance rod structure 5 comprising of a balance rod holder piece 2 and balance rods 1. In this embodiment the balance rods 1 are curved. The balance rod guidance holes 7 are shaped to accept the curved shape of the balance rods 1.

Figure 4A:
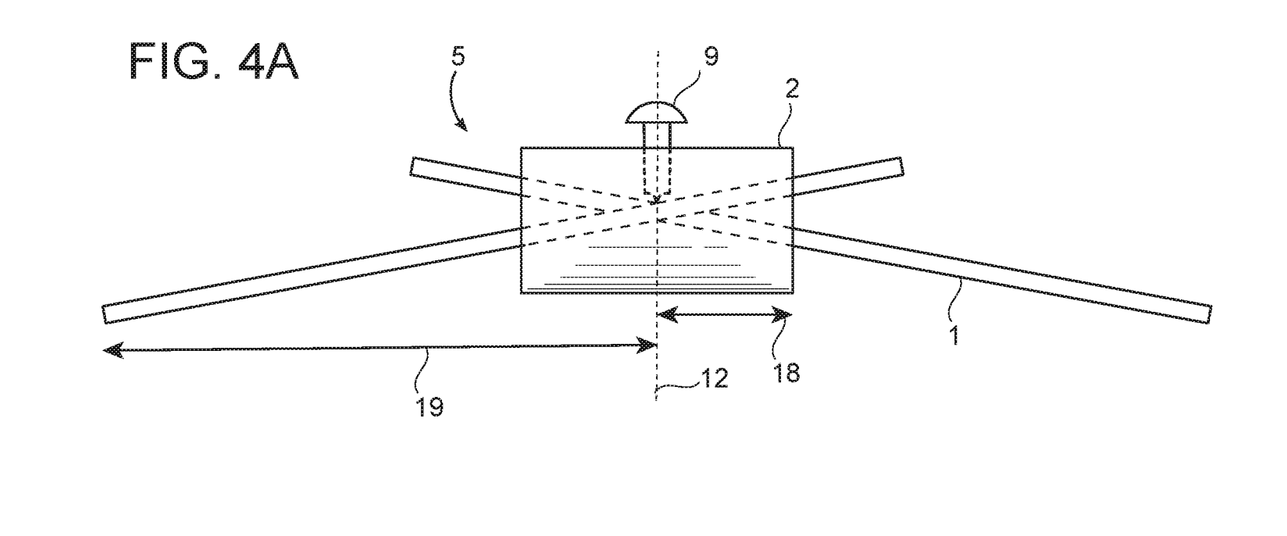
FIG. 4A is a rear view of an embodiment of a balance rod structure, in which the balance rods are at an angle to each other
Figure 4B:
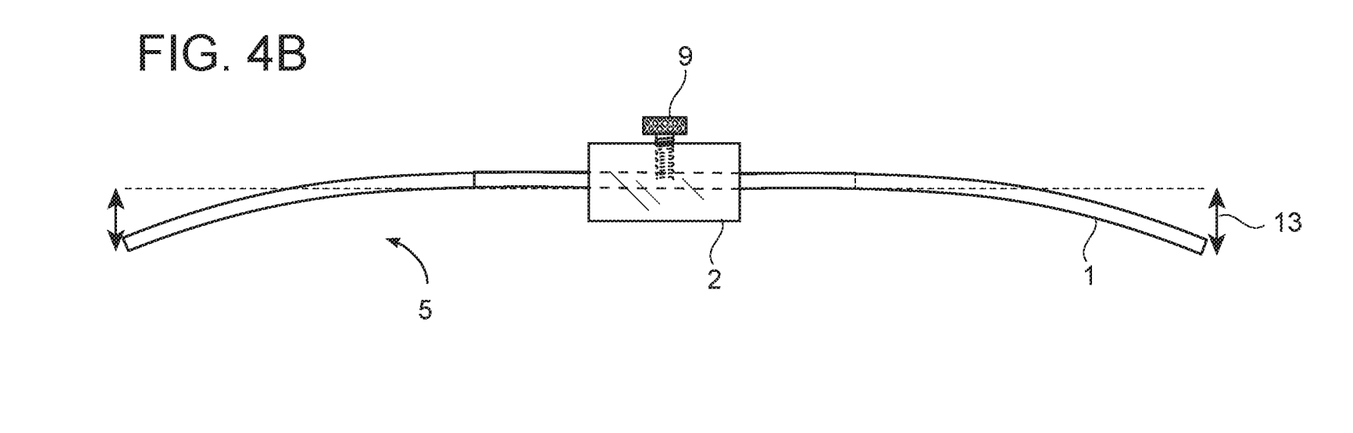
FIG. 4B is a rear view of an embodiment of a balance rod structure, in which the balance rods are flexible and bend downward

Referring to FIG. 4A is a rear view of an embodiment of a balance rod structure 5 comprising of a balance rod holder piece 2 and balance rods 1. The embodiment of the balance rod holder piece 2 has balance rod guidance holes 7 that do not orient the balance rods 1 in a straight line with each other but instead the balance rods 1 are at an angle to each other. The balance rods 1 in FIG. 4A form an approximate angle of 160 degrees to each other. The angle formed between balance rods 1 can vary. Most embodiments, that do include an angle, will have an angle of less than 180 degrees and greater than 120 degrees. An example of an embodiment where the balance rods are oriented in a straight line with each other is FIG. 2B. The balance rods 1 that are in a straight line with each other would be considered in a 180 degree orientation to each other.

Referring to FIG. 3A is a perspective view of a balance rod apparatus 10. Attached to the balance rod holder piece 2 is an elongated connector 4 with a bend. The seat post 6 on most bicycles angle back, so the length and the bend in the elongated connector prevents the balance rod holder piece 2 from hitting the back wheel of the bicycle 3.

FIG. 6B pictures movement of the balance rods 1, while the length of extension of the balance rods 1 are kept constant. Other possible embodiments which are not shown, can allow a similar side-to-side movement 16 of the balance rods 1, as in FIG. 6B. An example of another embodiment providing this movement is an embodiment of a balance rod holder piece 2 made from a plate of metal and balance rod securing pieces 9 of two large screws for each balance rod, where the plate would be in a vertical orientation and the screws would be in a horizontal orientation, when connected to a bicycle 3. The screws would go through holes in the balance rods 1 and screw into the balance rod holder piece 2. The screws would only have threads on part of the shaft, from the tip of the screw to part way up the shaft, which would only allow the screw to go into the balance rod holder piece 2 a pre-determined length, which would not allow the screws to hold the balance rods 1 securely, which would allow the jiggling, rattling, or slight swaying movement of the balance rods 1.

The approximate amount of movement that will produce the jiggling, rattling, or slight swaying, without a change in the length of extension of the balance rods 1, can be defined as allowing the tip of a balance rod 1 to move a maximum of 1 to 4 inches away from the original resting position of the balance rod tip, when the apparatus is used, when a segment of the balance rod 1 is extended 4 feet away from the balance rod holder piece 2. The measurements are taken after any removable weights 8 are removed from the ends of the balance rods 1, and if a weight 8 is not removable the measurements are taken whereby the weight 8, which is not removable, is considered part of the balance rod 1 such that the length of extension and the distance for movement from original resting position includes any added distance from the weight 8. The measurement for the distance extended is taken from the surface of balance rod holder piece 2 at the point of attachment of the bottom surface of the balance rod 1 and balance rod holder piece 2, to the end of the balance rod 1 on the corresponding bottom surface of the balance rod 1, which is considered the tip for this measurement. The bottom surface is determined by the orientation that the balance rod apparatus 10 will attach to the bicycle. The measurement for the movement from the resting position is taken from the same end of the balance rod 1 on the corresponding bottom surface of the balance rod 1, used for the length of extension measurement, where the resting position is the first point for measurement and the farthest distance that the balance rod 1 can be moved is the second point for measurement, where the distance of movement is the distance between the two points of measurement. In FIG. 6C the arrowed lines labeled 17 represents the distance the tips of the balance rods 1 will move from their resting positions. The amount of movement can vary depending on the desired effect and the length of the balance rod 1.

Figure 7A:
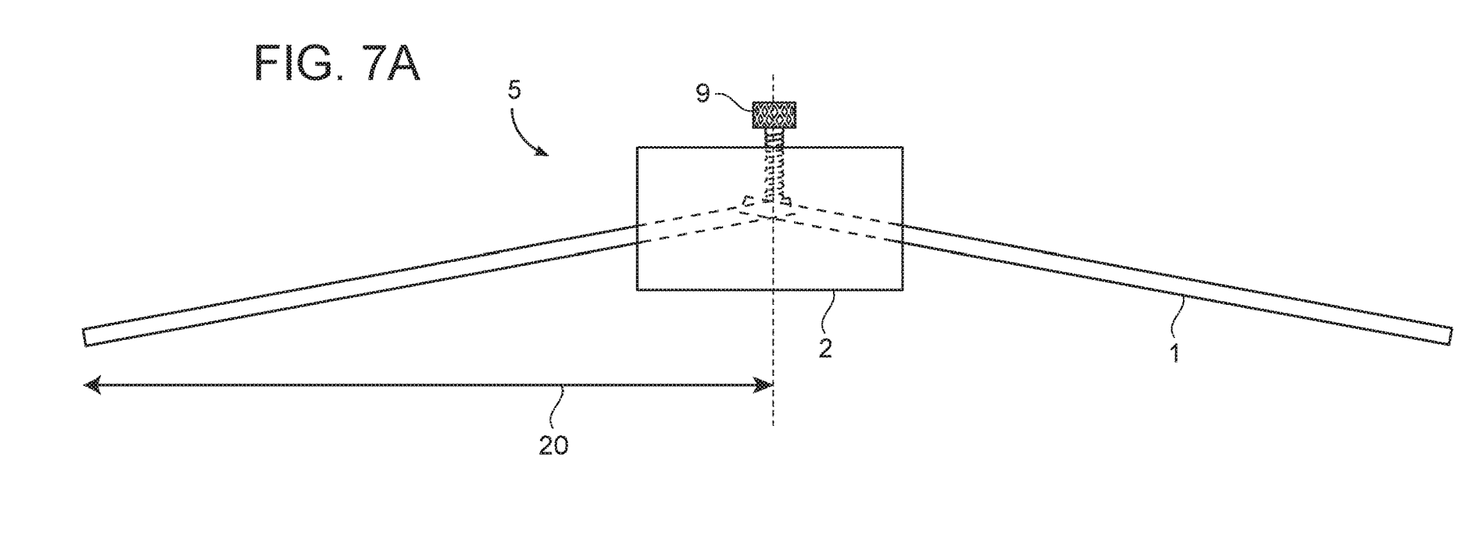
FIG. 7A is a rear view of an embodiment of a balance rod structure, indicating the maximum length of extension by a balance rod past the central axis of the balance rod holder piece
Figure 7B:
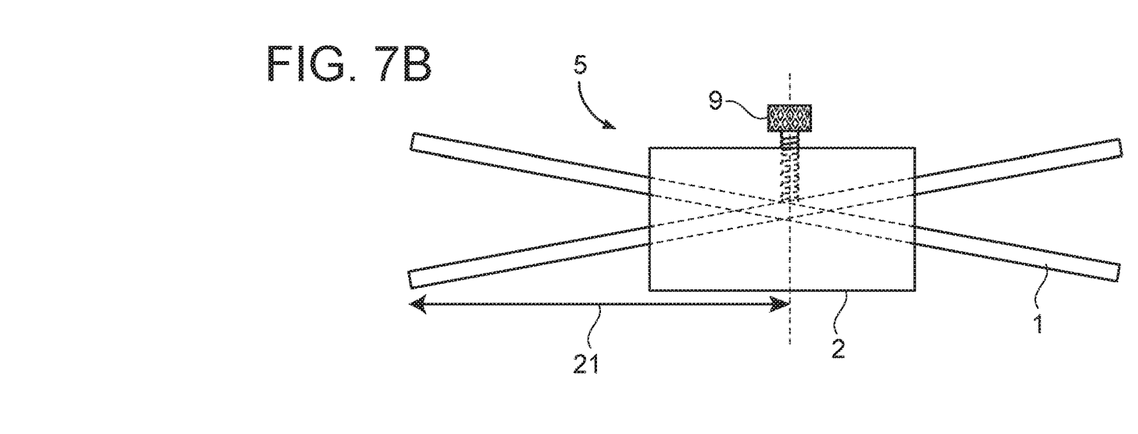
FIG. 7B is a rear view of an embodiment of a balance rod structure, indicating the minimum functional length of extension by a balance rod past the central axis of the balance rod holder piece

Referring to FIG. 4A is a rear view of a balance rod structure 5. The dotted line down the center of the balance rod holder piece 2 represents the central axis of a balance rod holder piece 2 which is labeled 12. The distance that the outermost part of the balance rod holder piece 2 extends laterally from the central axis of the balance rod holder piece 2 is shown by the arrowed line labeled 18. The distance that the tip of a balance rod 1 extends laterally from the central axis of the balance rod holder piece 2 is shown by the arrowed line labeled 19. Most embodiments of the balance rod apparatus 10 will have a balance rod holder piece 2 which is much smaller than the balance rods 1. Therefore the distance of lateral extension of the outermost part of the balance rod holder piece 2 will be smaller than the distance of lateral extension of the balance rods 1. Additionally, embodiments of the balance rod apparatus 10 will have the ability to adjust the distance of extension of the balance rods 1. The amount by which the distance of extension of the balance rods 1 can be adjusted can be measured by the difference between the maximum distance a balance rod 1 will extend from the central axis of the balance rod holder piece 2, which is represented by the arrowed line labeled 20 in FIG. 7A, and the minimum distance the same balance rod 1 will functionally extend from the central axis of the balance rod holder piece 2, which is represented by the arrowed line labeled 21 in FIG. 7B. The term of functional extension is used to describe the idea that if the balance rod 1 in the embodiment in FIG. 7B was extended a shorter distance than the distance shown, then the other end of the balance rod 1 would extend farther past the central axis of the balance rod holder piece 2, therefore increasing the balancing effect on other side which is not being measured, therefore the position of the balance rod 1 being measured in FIG. 7B is at its minimal length of functional extension. The line of measurement for the distance of lateral extension of a balance rod 1 from the central axis of the balance rod holder piece 2 is a line that is perpendicular to the central axis of the balance rod holder piece 2, where the start of the line is the central axis of the balance rod holder piece 2 and the end of the line is the outermost part of the balance rod 1. The measurements are taken after any removable weights 8 are removed from the ends of the balance rods 1, and if a weight 8 is not removable the measurements are taken whereby the weight 8, which is not removable, is considered part of the balance rod 1 such that the length of lateral extension includes any added distance from the weight 8.

During preliminary tests of a prototype of the balance rod apparatus 10, a prototype was attached to the bicycle 3 of two different riders: (a) a new bicycle rider who never rode a bicycle 3 before; and (b) a new bicycle rider who was able to ride only short distances. In the prototype tests, with the new bicycle rider who never rode a bicycle 3 before, the prototype provided what was perceived by the person teaching the rider, as an increased ability to balance as compared to another bicycle rider, without the balance rod apparatus 10, who never rode a bicycle before. In the prototype tests, with the bicycle rider who was able to ride only short distances, the new bicycle rider stated that it was easier to ride with the balance rod apparatus 10 attached as compared to not having the balance rod apparatus 10 attached.

Additionally, after the new riders lost control of their bicycles 3, the balance rod apparatus 10 kept the bicycle 3 from falling completely to its side, therefore preventing the bicycle 3 from falling on the new riders. This is seen as a positive attribute because many new riders can experience a hard fall where the bicycle 3 falls on them and this discourages the new rider from attempting to ride again.

The prototype consisted of wooden balance rods 1 with a circular cross section with the dimensions of approximately 1.25 inches in diameter and 4.5 feet long. The wood material of the balance rod 1 was similar to what can be bought commercially as a wooden curtain rod. The balance rod holder piece 2 was a rectangular block of wood having approximate dimensions of 5 inches×2.5 inches×3 inches. The wood material of the balance rod holder piece 2 was similar to what can be bought as "2×6 lumber," which has actual dimensions less than 2×6 inches, where two pieces of 3 inch long lumber were glued together. The balance rod holder piece 2 had two rod guidance holes 7 through the block from one side to the opposite side, of the 5 inch×3 inch sides. The connector 4 included four pieces of plywood. Two pieces of plywood were glued together to form one half of the connector 4 and another two pieces of plywood were glued together to form the other half of the connector 4. In a section in the middle of the two halves of the connector 4, there was a cut away, which was reinforced with metal, which fit around the seat post 6 of the bicycle 3. The two halves of the connector 4 were attached together with two bolts, one on each side of the seat post 6 cut away, going through both halves of the connector. One half of the connector 4 was glued to a 2.5 inch×3 inch side of the balance rod holder piece 2. The individual pieces of plywood measured approximately 3 inches×5 inches×0.375 inches resulting in a connector 4, when all 4 pieces of plywood were glued and bolted together, of 3 inches×5 inches×1.5 inches. The balance rod securing pieces 9 were screws, similar to drywall screws, which went through the balance rod holder piece 2 into the balance rods 1, where the screws went through the balance rod holder piece 2, on the side measuring 5 inches×2.5 inches.

During the prototype tests, after the new riders lost control and their bicycles fell, the length of extension of the balance rods 1 did not change and the balance rods 1 did not break. After the prototype was used a few times, sustaining falls, the glue joint separated between the connector 4 and balance rod holder piece 2 and the wood of the connector 4 at the same glue joint cracked. Additionally, the balance rod apparatus 10 did twist after the fall, which was interpreted as the connector 4 not being tightened enough to the seat post 6, because either the cut away in the connector 4 was too large or the bolts connecting both halves of the connector 4 were not tightened enough.

During the prototype tests, the balance rod guidance holes 7 were slightly oversized for the balance rods 1, which produced two effects. One, the balance rods 1 had a slight sway when in use. And, two, the balance rods 1 had a downward projection because the oversized balance rod guidance holes 7 did not hold the balance rods in a horizontal position, therefore causing the balance rods 1 to form an angle with each other which was smaller than 180 degrees.

The present invention is not limited to the above described embodiments. The above described embodiments are merely illustrative and other variations and modifications may be possible without departing from the scope of the present invention.

The invention claimed is:
1. An apparatus comprising,
a clamp tightened with a nut and bolt,
a block, where the clamp is attached to the block, the block has a first hole and a second hole, the first hole in the block has two openings on the surface of the block, the second hole in the block has two openings on the surface of the block, the first hole in the block has a cross section of an oval shape, the second hole in the block has a cross section of an oval shape,
a first balance rod and a second balance rod, the first balance rod has a cross section of an oval shape, the second balance rod has a cross section of an oval shape, the first balance rod is oriented through the first hole in the block, the second balance rod is oriented through the second hole in the block, the first balance rod and the second balance rod are adjustably attached to the block, a first screw, where the first screw is a balance rod securing piece which adjustably attaches the first balance rod to the block, a second screw, where the second screw is a balance rod securing piece which adjustably attaches the second balance rod to the block, holes along the length of the first balance rod, where the first screw fits into the holes along the length of the first balance rod, holes along the length of the second balance rod, where the second screw fits into the holes along the length of the second balance rod, where the first balance rod is adjusted in the length of extension of the first balance rod from the block by changing the hole along the length of the first balance rod which the first screw fits into, where the second balance rod is adjusted in the length of extension of the second balance rod from the block by changing the hole along the length of the second balance rod which the second screw fits into, the first balance rod has a first end and a second end, the second balance rod has a first end and a second end, a first weight removably attached to the first end of the first balance rod, a second weight removably attached to the second end of the first balance rod, a third weight removably attached to the first end of the second balance rod, and a fourth weight removably attached to the second end of the second balance rod.

* * * * *